May 18, 1965 W. VENEMA 3,183,885
INDICATING DIAL

Filed March 6, 1964 3 Sheets-Sheet 1

INVENTOR
WILLIAM VENEMA

BY James J. Cannon

ATTORNEY

May 18, 1965 W. VENEMA 3,183,885
INDICATING DIAL
Filed March 6, 1964 3 Sheets-Sheet 2

INVENTOR
WILLIAM VENEMA
BY James J. Cannon
ATTORNEY

May 18, 1965 W. VENEMA 3,183,885
INDICATING DIAL

Filed March 6, 1964 3 Sheets-Sheet 3

INVENTOR
WILLIAM VENEMA

BY James J. Cannon
ATTORNEY

United States Patent Office 3,183,885
Patented May 18, 1965

3,183,885
INDICATING DIAL
William Venema, 33 Lee Drive, North Haledon, N.J.
Filed Mar. 6, 1964, Ser. No. 350,000
5 Claims. (Cl. 116—124)

The present invention relates to an indicating dial and it consists in the combinations, constructions and arrangements of parts hereinafter to be described and claimed.

Generally there is provided a device which is of particular utility when utilized in connection with such instruments as variable resistors, inductors and capacitors, for example. However, as will be readily apparent to those skilled in the art, the invention is susceptible to various other applications. The device essentially consists of a knob which is attached to a shaft to be rotated and which is provided with an integral annular dial having indicia thereon adapted to indicate the particular position of the shaft or, in other words, the amount that the shaft has been rotated in a single or partial revolution. The device also includes an independently mounted annular dial and a novel means by which it is adapted to be rotated a fraction of its circumference upon each revolution of the shaft by the aforesaid knob. The device also includes a cover which encompasses the independently mounted dial and which cover is provided with an opening through which the indicia upon the independently mounted dial may be viewed to indicate the number of revolutions having been made by the shaft at a given moment. The device further includes a novel locking means for locking the knob against turning, and also a novel locking means for locking the independently mounted dial.

It is accordingly an object of the invention to provide a novel indicating dial which is relatively simple in construction, inexpensive to manufacture and yet effective and efficient in use.

Another object of the invention is to provide, in a device of the character set forth, a novel endless chain drive forming a part of the invention.

Still another object of the invention is to provide, in a device of the character set forth, a novel lock forming a part of the invention.

A further object of the invention is to provide, in a device of the character set forth, a novel apertured cover forming a part of the invention.

Figure 1:
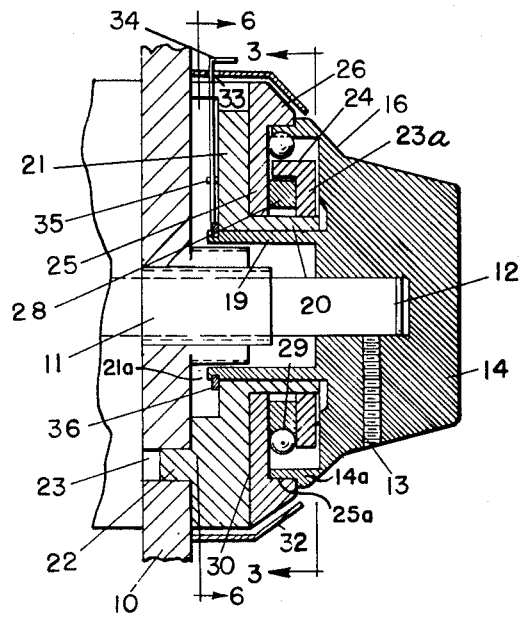
Figure 2:
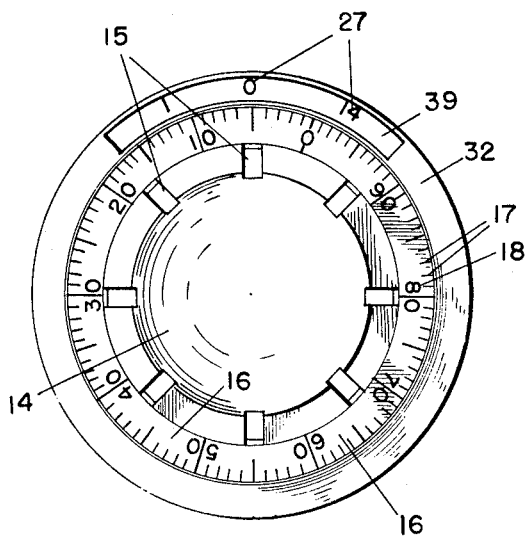
Figure 3:
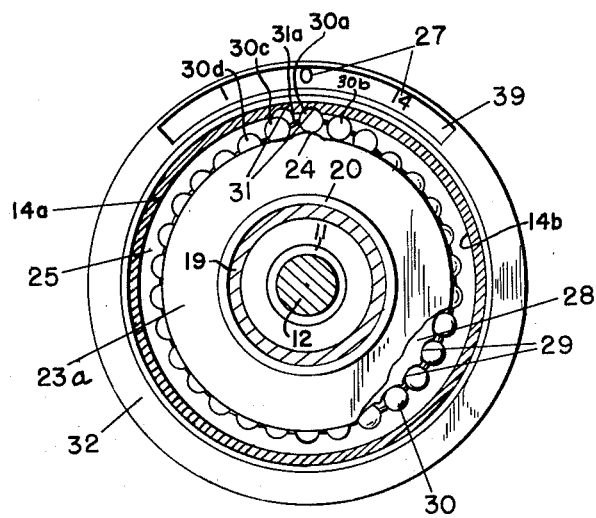
Figure 4:
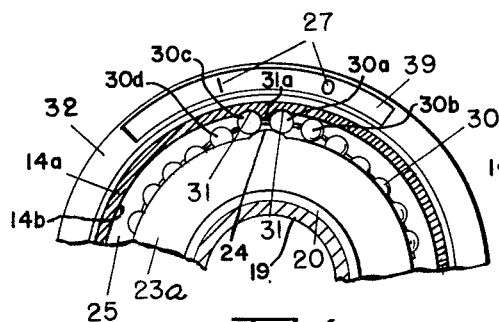
Figure 5:
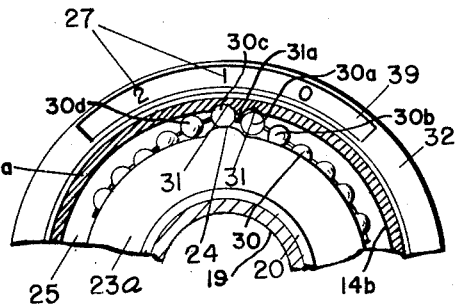
Figure 6:
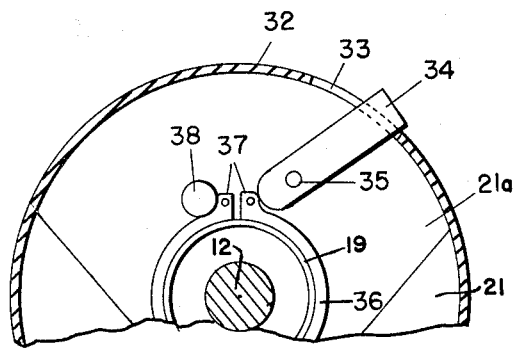
Figure 7:
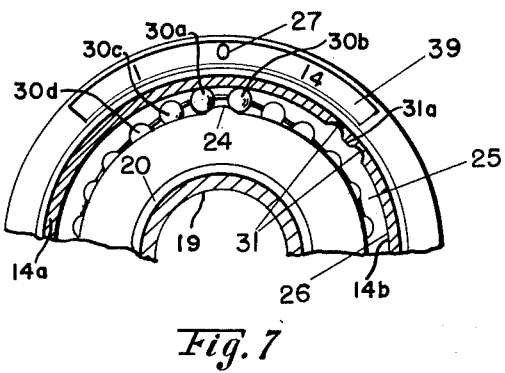
Figure 8:
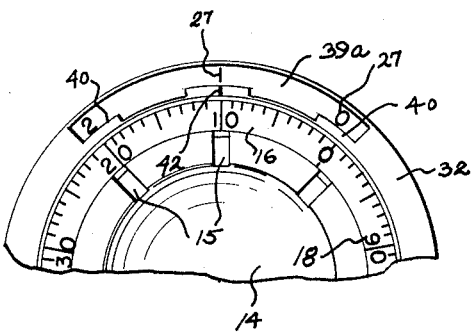
Figure 9:
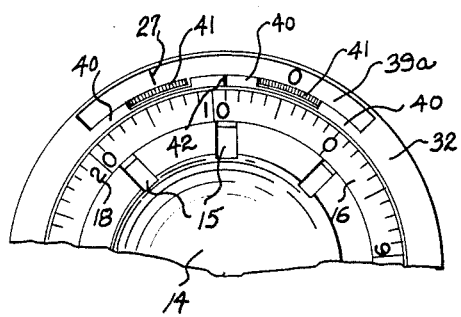

Other and further objects of the invention will become apparent from a reading of the following specification taken in conjunction with the drawings, in which:

FIGURE 1 is a fragmentary longitudinal sectional view of an embodiment of the invention, FIGURE 2 is a front elevational view thereof, FIGURE 3 is a sectional view, partly broken away, taken substantially along line 3—3 of FIGURE 1 and showing an endless chain motion transmitter in its approaching position, FIGURE 4 is a fragmentary view similar to FIGURE 3 but illustrating the position of the chain during actual motion transmission, FIGURE 5 is a view similar to FIGURE 4 but showing the position of the device after motion has been transmitted thereby, FIGURE 6 is a fragmentary sectional view taken substantially along line 6—6 of FIGURE 1, FIGURE 7 is a view similar to FIGURE 4 but illustrating the position of the device when the outer dial is in locked condition, FIGURE 8 is a fragmentary front elevational view illustrating a warning device which forms a part of the invention, and showing the same in normal condition, and FIGURE 9 is a view similar to FIGURE 8 but showing the same in a warning condition.

Referring more particularly to the drawings, there is shown therein an instrument panel 10 having a fitting 11 through which a rotatably mounted shaft 12 extends.

Affixed to the shaft 12 by means of a set screw 13 is a knob 14 of generally frusto-conical shape and provided with a series of circumferentially spaced grooves 15. Integrally formed with the rearward end portion of the knob 14 is an outwardly and rearwardly sloping annular dial 16 having graduations 17 and indicia 18 thereon adapted to indicate portions of a single revolution of the shaft 12.

A circular base plate 21 having a recess 21$^a$ in the rear face thereof, and a central aperture through which the fitting 11 and shaft 12 extend, is mounted in fixed position against the outer face of the panel 10 by a stud 22 which extends rearwardly from the base plate 21 into an aperture 23 in the panel 10. The base plate 21 is provided with an integral elongated axially disposed tubular sleeve 20 which extends forwardly therefrom about the fitting 11 and shaft 12. A thin circular plate 23$^a$, having a central aperture into which the sleeve 20 extends, is welded, or otherwise rigidly secured, to and about the outer free end of the sleeve 20.

A disk 25, having a circular concentric recess 25$^a$ of greater diameter than the plate 23$^a$ in the front face thereof, is rotatably mounted upon the sleeve 20 with the rear face thereof disposed in sliding contact with the front face of the base plate 21. The annular section 26 of the disk 25 about the recess 25$^a$, which is provided with an outwardly and rearwardly sloping front face having graduations and indicia 27 thereon, constitutes a dial for indicating the number of complete revolutions imparted to the shaft 12 by the knob 14.

A ring 28, of lesser outside diameter than the plate 23$^a$, is concentrically secured to the front face of the disk 25 with the front face thereof disposed in sliding contact with the rear face of the plate 23$^a$. The periphery of the ring 28 is provided with equally spaced arcuate indentations 29.

The knob 14 is provided with a rearwardly extending concentric tubular hub 19 which is rotatably mounted in the sleeve 20 and extends therethrough into the recess 21$^a$ in the rear face of the base plate 21. The knob 14 is also provided with an annular flange 14$^a$ which extends rearwardly from the dial section 16 thereof into the recess 25$^a$ in the base plate 21 about the plate 23$^a$ and ring 28 in spaced relation thereto.

The plate 23$^a$ is provided with a convexly curved projection 24 which extends outwardly from the periphery thereof and rearwardly therefrom over the ring 28 in spaced relation to the inner periphery 14$^b$ of the flange 14$^a$. An endless chain 30 of the bead and link type, which is disposed about the ring 28 with the beads thereof engaged in the indentations 29 thereof, extends over the convex outer surface of the projection 24 with an adjacent pair of beads normally engaging the opposed arcuate sections of the outer surface of the projection 24 and the inner periphery 14$^b$ of the flange 14$^a$, as shown in FIG. 7.

The inner periphery 14$^b$ of the flange 14$^a$ is provided with a pair of spaced arcuate indentations 31, which are spaced in accordance with the spacings between successive beads of the chain 30. Between the indentations 31 the inner periphery 14$^b$ of the flange 14$^a$ is provided with a radial inwardly extending boss 31$^a$ the sides of which are of the same curvature as the indentations 31 and constitute extensions thereof.

During operation the dial 16 will indicate the angular extent of each revolution of the knob 14, and consequently the shaft 12. At the end of each revolution of the knob 14 the dial 26 is advanced one increment of revolution and will therefore indicate the number of complete revolutions imparted to the shaft 12 by the knob 14. As the knob 14 is rotated clockwise, as shown in FIGS. 2 to 5 and 7, after each revolution thereof the boss 31$^a$, which extends inwardly from the inner periphery 14$^b$ of the flange 14$^a$ about the chain 30, will clear the beads thereof, and the ring 28 and the disk 25, carrying the dial 26, to which the ring 28 is secured will be locked against rotation due to the engagement of a pair of adjacent chain beads 30$^a$ and 30$^b$ with opposite sides of the projection 24 and the inner periphery 14$^b$ of the flange 14$^a$, as shown in FIG. 7. As the boss 31$^a$ approaches the fixed projection 24 it will clear the bead 30$^c$ and engage the bead 30$^a$ and move it upwardly on the projection 24 and into the leading indentation 31, and thereby advance the bead 30$^b$ away from the side of the projection 24, as shown in FIG. 3. Further movement of the boss 31$^a$ will advance the bead 30$^c$ into engagement with the projection 24 and up into the trailing indentation 31, as shown in FIGS. 4 and 5. Still further movement of the boss 31$^a$ will cause the beads 30$^a$ and 30$^c$ to leave the indentations 31 and the beads 30$^c$ and 30$^d$ to be moved into locking engagement between the fixed projection 24 and the inner periphery 14$^b$ of the flange 14$^a$ and the boss 31$^a$ to move out of engagement with the bead 30$^a$. This movement of the chain 30 by the engagement of the boss 31$^a$ with the beads thereof will rotate the ring 28 and with it the disk 25 one increment of revolution.

A braking mechanism by which the knob 14, and with it the shaft 12, may be locked against rotation is provided in the recess 21$^a$ in the rear face of the base plate 21. As shown in FIG. 6 the brake mechanism comprises a split ring 36 which is loosely disposed about the rear end of the hub 19 which extends into the recess 21$^a$, a fixed abutment 38 which extends rearwardly from the base plate 21, and a lever 34 which is pivotally mounted, as indicated at 35, to the base plate 21. The split ring 36 is provided with a pair of spaced ears 37 which extend outwardly from the opposed ends thereof between the abutment 38 and the inner end of the lever 34. Actuation of the lever 34 will force the ears 37 toward each other and thereby clamp the ring 36 tightly about the end of the hub 19.

A cover 32, which is mounted in fixed position about the base plate 21 and the disk 25, is provided with a slot 33 through which the outer end of the lever 34 extends and an arcuate opening 39 through which the indicia 27 on the annular section 26 of the disk 25 may be viewed.

In FIGURES 8 and 9 there is shown a modified form of the invention wherein the cover 32 is provided with an arcuate opening 39$a$, the lower edge of which is provided with raised portions 40. The forward portion of the section 26 bears blocks 41 of a warning color such as red while the centermost of the raised portions 40 is centrally provided with a vertical marker 42 which may be read with the indicia 27 on the section 26 when the device is in normal condition as shown in FIGURE 8 with the blocks 41 hidden by the raised portions 40. When, for any reason, the section 26 and its associated mechanism is out of alignment as, for example, when a complete movement of the section 26 has not yet been achieved as above described, the blocks 41 will be displayed as shown in FIGURE 9, between the raised portions 40 thereby indicating to the user that the indicia 27 have not as yet assumed their proper relation to the marker 42.

While only certain forms of the invention have been shown and described herein, it will be readily apparent to those skilled in the art that many minor modifications may be made without departing from the spirit of the invention or the scope of the appended claims.

What is claimed is:

1. An actuating and revolution indicating mechanism which is adapted to be connected to a rotatable control shaft of an instrument, said mechanism comprising; a shaft actuating knob, means by which said knob is adapted to be secured to the outer end of said shaft, a graduated annular dial secured to said knob about the rear end of said hub which is adapted to indicate fractional movements of each revolution of said shaft, a base plate which is adapted to be secured in fixed position adjacent an instrument panel, said base plate having a central aperture and an elongated tubular sleeve which extends forwardly from said base plate in axial alignment with said aperture and through which said shaft extends, said knob having an integral axially disposed elongated tubular hub which extends rearwardly therefrom and is rotatably mounted in said sleeve about said shaft, a circular plate secured to the outer end of said sleeve, a disk rotatably mounted on said sleeve in rearwardly spaced relation to said circular plate with the rear face thereof in contact with the front face of said base plate, the outer section of the front face of said disk being provided with an annular row of graduations constituting a dial for indicating the number of complete revolutions of said shaft, said knob having an integral concentric annular flange which extends rearwardly therefrom about said circular plate in radially spaced relation thereto, and interconnecting means which is disposed about said sleeve between the front face of said disk and the inner periphery of said annular flange which is operative to rotate said disk a fraction of a revolution at the end of each revolution of said knob and shaft and thereafter lock said disk against further movement until the next actuation thereof by said means.

2. An actuating and revolution indicating mechanism as defined by claim 1 in which said base plate and said disk are enclosed within a cylindrical cover which is secured in fixed position, the outer end of said cover having an inwardly extending annular flange which is disposed over the graduations on the outer section of said disk, and an aperture in said inwardly extending annular flange through which successive graduations are visible as said disk is rotated.

3. An actuating and revolution indicating mechanism as defined by claim 1 in which the rear face of said base plate is provided with a recess into which the rear of said tubular hub extends, and in which a braking mechanism is disposed which is adapted to engage the rear end of said tubular hub to lock said knob and shaft against movement.

4. An actuating and revolution indicating mechanism as defined by claim 3 in which said braking mechanism comprises a split ring disposed around the rear end of said tubular sleeve, a fixed abutment which extends rearwardly from said base plate, a lever which is pivotally secured to said base plate with the outer end thereof extending out through an elongated slot in said cover, a pair of spaced apart opposed ears one of which is secured to each end of said split ring and extend radially outwardly therefrom between said abutment and the inner end of said lever with one of said ears engaging said fixed abutment, said lever being operative to move the other of said ears towards the said one of said ears and thereby firmly clamp said split ring about the rear end of said tubular hub.

5. An actuating and revolution indicating mechanism as defined by claim 1 in which said interconnecting means comprises; a ring which is secured to the front face of said disk concentrically about said sleeve with the front face thereof disposed in contact with the rear face of said plate, the periphery of said ring being provided with equally spaced arcuate indentations, a projection having an arcuate top surface which is integral with said plate and extends radially outwardly from the periphery thereof and rearwardly therefrom over said ring, an endless chain of the bead and link type disposed about said ring and over the arcuate top surface of said outwardly extending projection with a pair of adjacent chain beads in contact with opposite sides of the said arcuate top surface of said projection and the other of said chain beads engaging the arcuate indentations in the periphery of said ring; a pair of circumferentially spaced arcuate indentations in the inner periphery of the said rearwardly extending annular flange secured to said knob, the spacing of said indentations being the same as the spacing of the chain beads and the indentations in the periphery of said ring, and a boss which is secured to and extends inwardly from the inner periphery of said rearwardly extending annular flange between the arcuate indentations therein; said boss being rendered operative by the rotation of said knob to engage one of said pair of beads and force it and the next succeeding bead upwardly on said projection and into the said pair of arcuate indentations in said flange and thereby rotate said disk a fixed amount through said chain and said ring at the completion of each revolution of said knob and shaft.

References Cited by the Examiner

UNITED STATES PATENTS

| | | | |
|---|---|---|---|
| 2,539,575 | 1/51 | George | 116—133 |
| 2,746,417 | 5/56 | McCord et al. | 116—124 |
| 2,746,573 | 5/56 | Hasting | 74—10.2 |
| 2,775,896 | 1/57 | Silvey et al. | 116—124 |
| 2,780,941 | 2/57 | Kollmorgen | 74—10.2 |
| 2,805,636 | 9/57 | Smith | 116—115 |
| 2,881,295 | 4/59 | Brown | 338—120 |
| 2,901,998 | 9/59 | Keith | 116—115 |
| 2,980,055 | 4/61 | Burns | 116—115 |
| 2,991,662 | 7/61 | Werner | 74—10.2 |
| 3,121,210 | 2/64 | Orozco | 74—10.2 |
| 3,136,294 | 6/64 | Arnold et al. | 116—115 |

LOUIS J. CAPOZI, *Primary Examiner.*